United States Patent
Horvath et al.

(10) Patent No.: US 6,473,003 B2
(45) Date of Patent: Oct. 29, 2002

(54) SELECTABLE RANGE RING FOR AN ADS-B CDTI COCKPIT DISPLAY

(75) Inventors: Steve Horvath, Salem; Robert Grove, Newberg, both of OR (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/798,615

(22) Filed: Mar. 2, 2001

(65) Prior Publication Data

US 2002/0008640 A1 Jan. 24, 2002

Related U.S. Application Data

(60) Provisional application No. 60/204,112, filed on May 15, 2000.

(51) Int. Cl.$^7$ ............................................. G08B 21/00
(52) U.S. Cl. ......................... 340/945; 340/961; 342/32
(58) Field of Search ............................... 340/945, 435, 340/903, 961; 342/32; 701/301

(56) References Cited

U.S. PATENT DOCUMENTS

| | | | |
|---|---|---|---|
| 4,853,700 A | | 8/1989 | Funatsu et al. |
| 4,881,079 A | * | 11/1989 | Peregrim .................... 342/194 |
| 4,914,733 A | | 4/1990 | Gralnick |
| 5,111,400 A | | 5/1992 | Yoder |
| 5,179,377 A | | 1/1993 | Hancock |
| 5,202,690 A | | 4/1993 | Frederick |
| 5,227,786 A | | 7/1993 | Hancock |
| 5,321,406 A | * | 6/1994 | Bishop et al. ................ 342/32 |
| 5,337,057 A | * | 8/1994 | Michie ........................ 342/176 |
| 5,493,309 A | | 2/1996 | Bjornholt |
| 5,548,515 A | | 8/1996 | Pilley et al. |
| 5,838,262 A | | 11/1998 | Kershner et al. |
| 5,867,804 A | | 2/1999 | Pilley et al. |
| 5,978,715 A | | 11/1999 | Briffe et al. |
| 6,052,100 A | * | 4/2000 | Soltan et al. ................... 345/6 |
| 6,271,768 B1 | * | 8/2001 | Frazier, Jr. et al. ......... 340/961 |

FOREIGN PATENT DOCUMENTS

| | | |
|---|---|---|
| EP | 0 411 309 A1 | 2/1991 |
| EP | 0-493-822 B1 | 7/1992 |
| EP | 0-493-822 A1 | 7/1992 |

OTHER PUBLICATIONS

W. H. Harman, "TCAS: A System for Prevailing Midair Collisions," *The Lincoln Laboratory Journal*, 1989, pp. 437–458; vol. 2, No. 3, United States of America.

* cited by examiner

*Primary Examiner*—John Tweel
(74) *Attorney, Agent, or Firm*—Alston & Bird LLP

(57) ABSTRACT

An electronic cockpit display of traffic information in a pilot's own aircraft, comprising: a traffic display out to a distance from the own aircraft at a periphery of the display set by an adjustable scale; and a range indicator display representing a selected physical distance from the own aircraft, the range indicator moving in a selectable range ring mode to maintain the selected distance from the own aircraft represented by the indicator as the adjustable scale changes. The range indicator display optionally may be selectively operable in an alternative half-scale range ring mode, in which the range indicator remains at the halfway position on the display as the adjustable scale changes, and in which the physical distance from the own aircraft represented by the indicator varies with the scale adjustment. Range monitoring may be provided using a range ring as the range indicator.

11 Claims, 5 Drawing Sheets

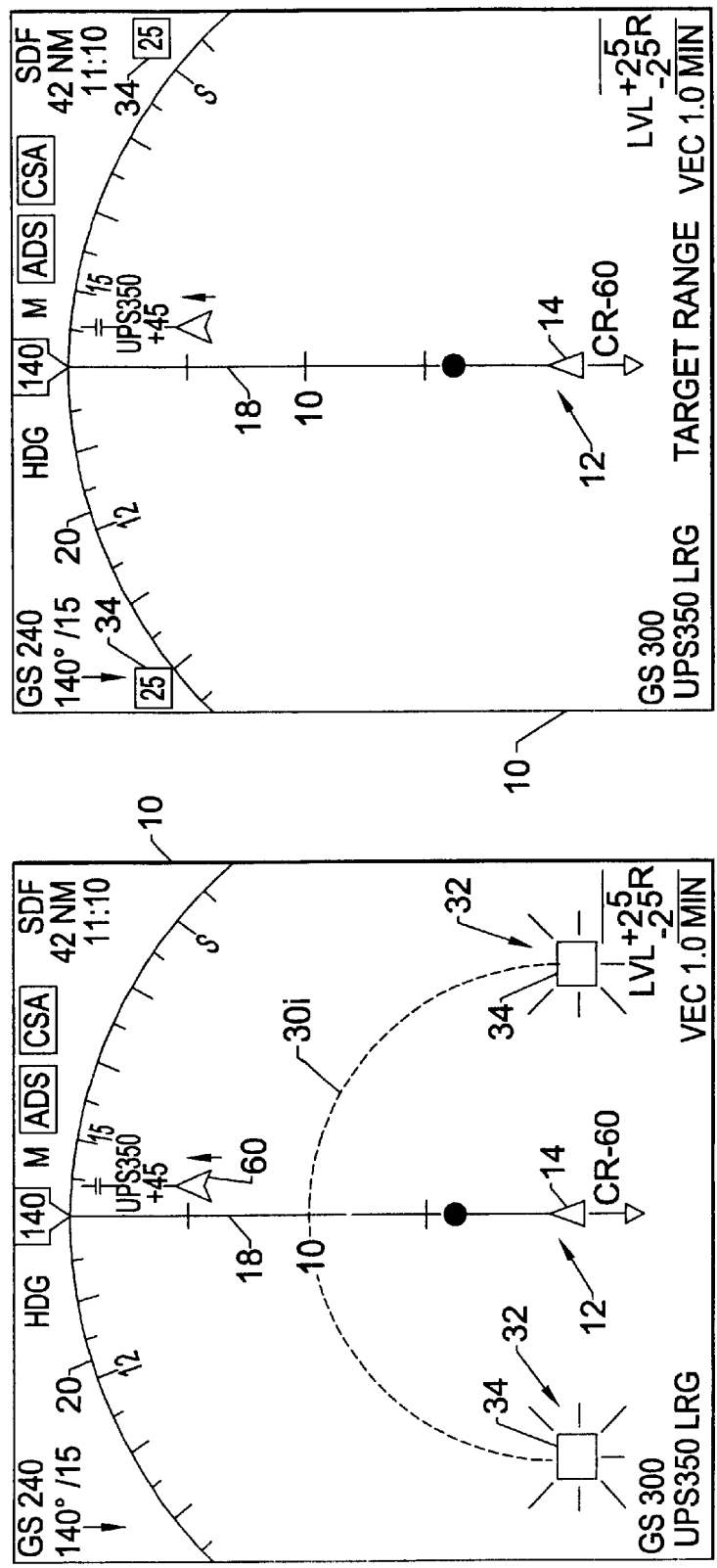

SELECTABLE RANGE RING FOR AN ADS-B CDTI COCKPIT DISPLAY

RELATED APPLICATION

This application claims the benefit of U.S. Provisional Patent Application No. 60/204,112, filed May 15, 2000.

TECHNICAL FIELD

This invention relates to providing a range indicator on a display representing a selected physical distance from an object, and more particularly on displays of traffic in the flight deck of aircraft, such as a cockpit display of traffic information (CDTI).

BACKGROUND ART

Traffic of interest is displayed to the pilot of an aircraft on a cockpit display of traffic information (CDTI). A CDTI display typically displays nearby target aircraft and information about the target aircraft, such as their altitude, heading, and identification. This information may be received from one or more sources, including Traffic Information Service (TIS) from ground air traffic control, and Automatic Dependent Surveillance-Broadcast (ADS-B) from transmitters on other aircraft, vehicles, or fixed structures. A CDTI may allow traffic to be displayed 360 degrees around a symbol of the pilot's own aircraft, or may display an arcuate area in front of the pilot's own aircraft, in which case the own aircraft symbol is placed toward the bottom edge of the screen.

A primary task for pilots is to be aware of nearby air traffic by maintaining a constant visual scan. If traffic is sighted, the pilot must first assess the threat posed by the intruder aircraft, then, if necessary, maneuver to avoid the other aircraft. This strategy is termed "see-and-avoid." The effectiveness of see-and-avoid depends on the ability of a pilot to visually acquire the intruder aircraft early enough in the encounter to enable threat assessment and avoidance. A CDTI assists the pilot with see-and-avoid by providing a display for nearby traffic when the pilot's aircraft is equipped to receive traffic information, and the nearby traffic is equipped to transmit their position information.

The ability to control the display of traffic is desirable to allow the pilot to de-clutter the display and focus on targets of interest. The ability to determine from the display the actions of nearby aircraft relative to the aircraft containing the display is also desirable for effective threat assessment and avoidance. Thus, there is a need for enhancements to CDTI units to provide graphic indications to help pilots track the actions and the status of nearby aircraft.

Prior systems have provided a "range ring" on the CDTI to mark the position half way to the periphery of the screen, where a compass rose is often displayed. Such a "half-scale" range ring may be a complete circle if the display is a full 360 degrees, or an arc if the display shows only the forward arcuate area. Multiple range rings have been provided, with the range rings being placed, for example, at one-third or one-quarter intervals. The pilot conventionally can alter the scale of the area shown on the screen. When this occurs the distance represented by the compass rose varies, and the distance from the pilot's own aircraft represented by the range ring changes in proportion. In other words, the spacing on the display screen from the own aircraft symbol to the range ring remains constant, but the physical display screen distance between the own aircraft and a target initially shown astride the range ring changes when the range scale changes.

If a pilot is monitoring the position of a target aircraft relative to the range ring, a change to the range scale changes the meaning of the target's position relative to the range ring. For example, if the range scale is set at 20 nautical miles at the position of a peripheral compass arc 20, as shown in FIG. 2A, the range ring 30h represents 10 nautical miles, and a target 60 positioned 8 nautical miles from the own aircraft is shown inside the range ring. If the pilot changes the range scale to a maximum of 10 nautical miles, as shown in FIG. 2B, the range ring represents 5 nautical miles, and the same target immediately appears far outside the range ring. The pilot may need to exercise some mental effort to adjust his or her perception to continue monitoring the target aircraft.

Thus, there is a need for a range indicator system that makes it easier to monitor the position of a target relative to the range indicator after a change in the overall range scale of a display.

SUMMARY OF THE INVENTION

The present invention is an improvement in displaying traffic information on a CDTI. The invention seeks to provide a range indicator system that makes it easier to monitor the position of a target relative to a range indicator after a change in the overall range scale of a display.

This object is accomplished in the present invention by moving the position of a range indicator on a display to maintain the indicator at a set physical distance represented by the indicator as the range scale of the display changes. Generally described, the present invention provides a method and system for displaying information on an electronic display relative to an object of known location, by providing a range indicator on the display representing a selected physical distance from the object; and moving the range indicator in a fixed distance mode to maintain the selected distance represented by the indicator while changing the scale of physical distance represented on the display.

In a preferred embodiment, the invention may also provide for selection, in the alternative, of a more traditional set-scale distance mode in which the range indicator is held at an initial position on the display while changing the scale of physical distance represented on the display. In this case, the physical distance from the object represented by the indicator is altered. The method and system of the invention may allow a user to choose either the fixed distance mode or the set-scale distance mode, and prompt a user choosing the fixed distance mode to enter a selected physical distance to be represented by the indicator. For example, the prompting may be provided by displaying a data entry area adjacent to the range indicator. Preferably, the fixed and set-scale modes of the range ring are visually distinguishable by way of a varied visual characteristic associated with the range indicator. For example, the manner or format of showing a numeral representing the distance of the range indicator from the object may be varied.

In a preferred embodiment, the electronic display is a cockpit display of traffic information, the object is an aircraft containing the display, and the range indicator is a range ring. The data entry areas then may be one or more text boxes adjacent to or intersecting the range ring. As an additional optional feature, an alert may be provided when a target is at or within the distance from the object represented by the range ring.

According to a more specific embodiment, the invention may provide an electronic cockpit display of traffic information in a pilot's own aircraft, comprising: a traffic display out to a distance from the own aircraft at a periphery of the display set by an adjustable scale; and a range indicator display representing a selected physical distance from the own aircraft, the range indicator moving in a fixed distance mode to maintain the selected distance from the own aircraft represented by the indicator as the adjustable scale changes. The range indicator display optionally may be selectively operable in an alternative set-scale distance mode, in which the range indicator remains at an initial position on the display as the adjustable scale changes, and in which the physical distance from the own aircraft represented by the indicator varies with the scale adjustment.

Thus it will be seen that a pilot using a display embodying the invention can choose to maintain the relative position of a target and a range ring when varying the range scale of the display, and in doing so can more easily track the position of the target.

Other features and advantages of the present invention will become apparent to one skilled in the art upon examination of the following drawings and detailed description. It is intended that all such features and advantages be included herein within the scope of the present invention as defined by the appended claims.

BRIEF DESCRIPTION OF THE DRAWINGS

The present invention can be better understood with reference to the following drawings. The elements of the drawings are not necessarily drawn to scale, emphasis instead being placed upon clearly illustrating the principles of the present invention.

FIG. 4 shows a cockpit display of target information having a range ring in a fixed distance mode according to the invention, with prompt boxes for entry of a selected distance.

FIG. 5 shows a cockpit display of target information having a range ring in a fixed distance mode with the selected distance greater than the maximum range of the display.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
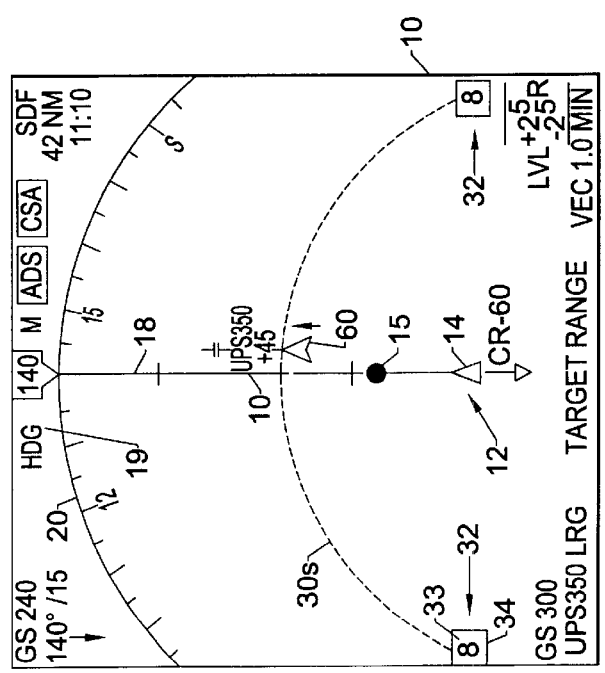
FIG. 1A shows a cockpit display of target information having a range ring in a fixed distance mode according to the invention, shown with a first range scale.

Referring now in detail to the drawings, in which like reference numerals refer to like elements throughout the several views, FIG. 1A shows a preferred embodiment of a cockpit display of target information (CDTI) 10. The CDTI is shown in a sweeping sector map-viewing mode in which the CDTI displays traffic in a forward looking arcuate sector with respect to the pilot's own aircraft, shown on the display by an own aircraft symbol 12. The own aircraft symbol 12 has two components, an outlined triangle 14 centered between the sides of the screen and positioned about one-quarter of the screen height from the bottom edge, and a ground track vector 15 that shows where the own aircraft will be in a selected time. A line 18 extends up the display screen from the own aircraft symbol to a compass arc segment 20, preferably divided into hash marked segments every 5 degrees. The line 18 shows the track of the own aircraft, and the current heading 19 of the own aircraft is indicated above the compass arc 20. Midway between the own aircraft symbol 14 and the arc 20, a number of nautical miles representing half the distance to the arc 20 is indicated. In the display 10 as shown in FIG. 1A, the range scale to the arc 20 is 20 nautical miles from the own aircraft, the heading is "140" degrees, and the vertical line is marked with the numeral "10" halfway along its length.

It should be understood that application of the present invention is not dependent on how the parameters of the underlying map-viewing mode are presented. Furthermore, the CDTI may be any appropriate display unit, such as a CRT display, flat panel display, or other display.

Figure 3:
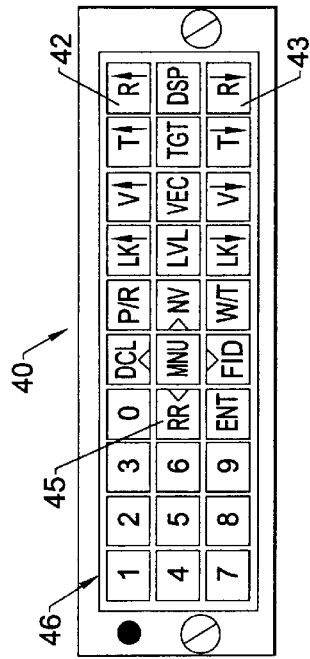
FIG. 3 shows a control keypad having keys for controlling the range ring function.

A control panel 40 is shown in FIG. 3. The control panel 40 includes a key 42 labeled "R↑" for increasing the range scale, and a key 43 labeled "R↓" for decreasing the range scale. The number and size of step adjustments taken by depressing the keys 42 and 43 may differ in multiple sets of such values provided with the system. A key 45 labeled "RR" is provided for initiating a range ring function. A keypad 46 is provided for numerical data entry. Other known types of data entry device can be used to control these functions.

Figure 7:
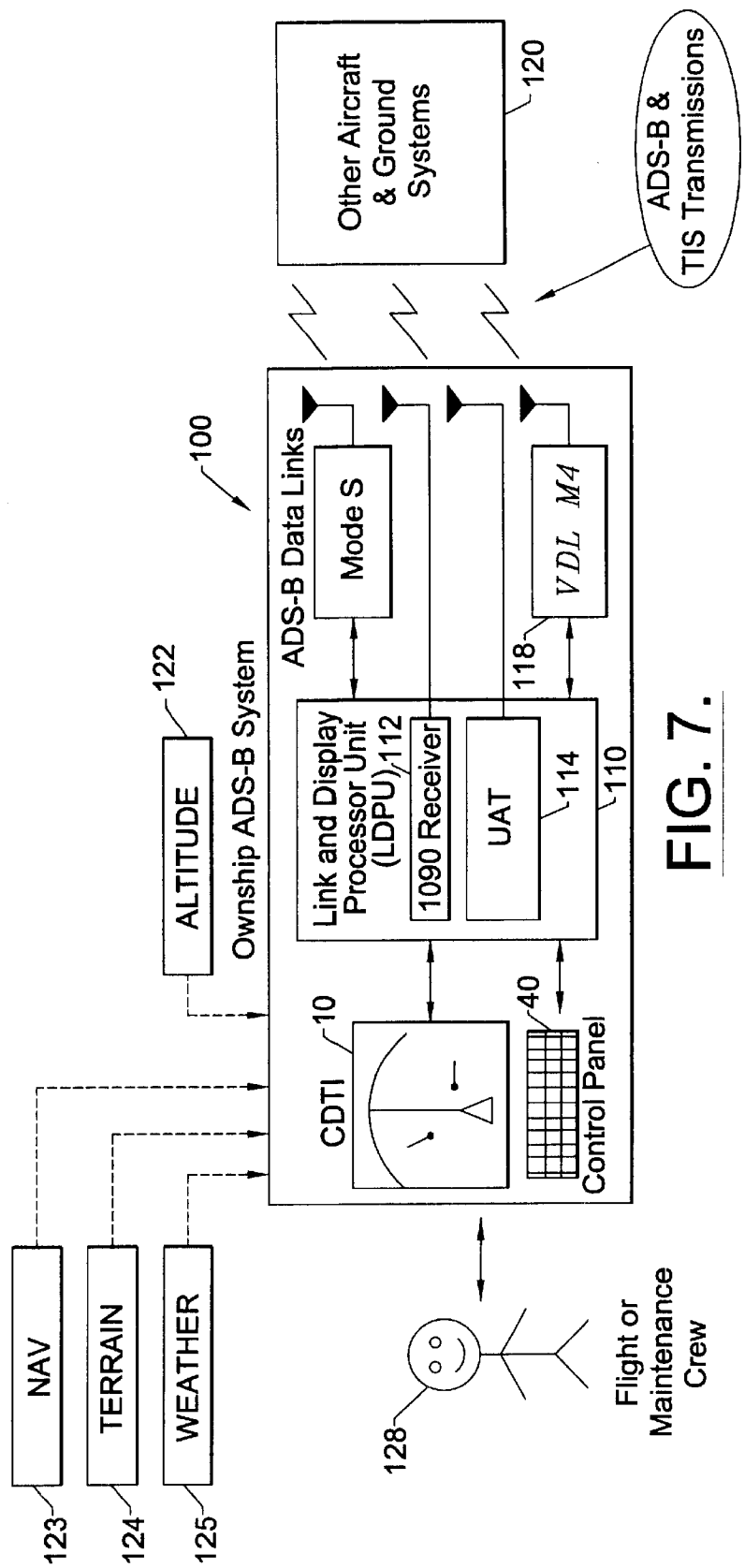
FIG. 7 shows a block diagram of an ADS-B system including a CDTI and control panel capable of embodying the present invention.

The CDTI 10 and control panel 40 are shown in an ADS-B system 100 in FIG. 7. The display 10 and control panel 40 are connected to a link and display processor (LDPU) unit 110 that receives signals over data links such as 1090 MHz data link 112, UAT data link 114, and VDL M4 data link 118 (if installed), from ADS-B transmissions transmitted from other aircraft or ground systems shown generically as block 120. TIS transmissions may be received by the own aircraft's Mode S transponder and forwarded to the LDPU 100. Future TIS-B systems are expected to broadcast TIS data over ADS-B data links. Position and velocity information are obtained from a global positioning system unit (not shown) within the LDPU 110. Altitude is obtained from an altimeter 122 or an air data computer or altitude encoder. Navigation information is obtained from a unit 123, which may be a flight management computer or inertial navigation system. A terrain awareness system 124 provides information for a terrain display and avoidance warnings. A weather radar input 125 also is provided to the display 10. The control panel 40 provides a user interface to enable a pilot 128 to control the data and graphics displayed on the CDTI 10. With knowledge of the control functions and display modes described herein, one skilled in the art of user interfaces and visual displays will be able to select and program appropriate hardware to make and use the described embodiments of the invention.

Figures 2A, 2B:
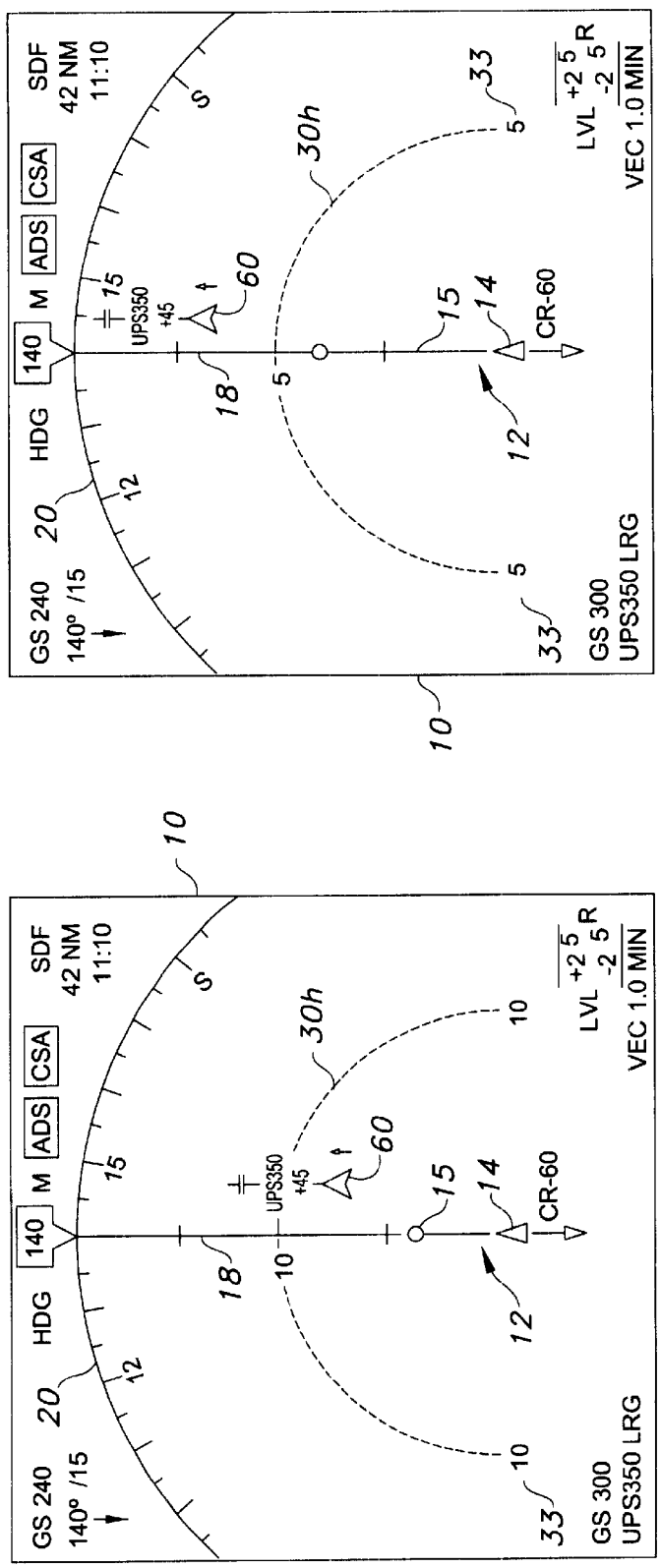
FIG. 2A shows a cockpit display of target information having a range ring in a half-scale distance mode as conventionally provided, shown with a first range scale.
FIG. 2B shows the cockpit display of FIG. 2A, with the range scale changed to a new setting.

Referring again to the control panel 40, when the range ring function is initiated, the pilot may choose either a half-scale range ring mode or a selectable range ring mode. Initially, a range ring 30h appears as shown in FIG. 2A in a half-scale range ring mode. The mode may be changed by the pilot in a manner described below. In the selectable (or fixed distance) range ring mode as shown in FIG. 1A, a semicircular range ring 30s is displayed centered on the own aircraft symbol 14, at a distance selected by the pilot. The selected distance is displayed at two range ring distance markers 32, each having an indicium 33 (in this example "8" nautical miles) within an outlined box 34.

The display 10 in FIG. 1A is in a selectable or fixed distance range ring mode in which the range ring 30s moves to different positions on the screen when the pilot changes the range scale by pressing the key 42 or 43. Of course, the selected range ring distance indicator 32 may be displayed only once, or may be displayed in any appropriate format or position. Preferably, the indicator 32 is adjacent to or closely associated with the range ring. The range ring 30s can be an arc segment shorter than a semicircle. Also, any appropriate graphic symbol to indicate or mark a distance from the own aircraft symbol can be used as a "range indicator" in providing the present invention. One type of range indicator is a "range ring," used herein to refer to either an arc or a full circle.

Initiation of the selectable range ring mode will now be described in more detail with reference to FIG. 4. When the pilot depresses the key 45, a range ring 30i appears with empty, flashing text boxes 34. The pilot then has a predetermined period of time, for example five seconds, to enter a selected range ring distance using numeral keys 46 on the control panel 40 shown in FIG. 3. The entered value 33 is displayed in both of the boxes 34, the boxes cease flashing but remain around the entered value. The range ring display is altered to the range ring 30s, positioned at the selected distance from the position of the own aircraft symbol 14. In the example shown in FIG. 1A, the range ring 30s is positioned at 8 nautical miles from the own aircraft symbol.

Optionally, if the entered value 33 is not within 10–90% of the current range scale, the selectable range ring may be rejected and a message presented on the display to inform the pilot that the range ring requested is too small or too large. Preferably, the selected range ring distance may be entered to 1/10 mile resolution for range scales of 10 miles or less; scales above 10 miles preferably permit resolution to 1 mile. Subsequent to establishing a selected range ring distance, the pilot may adjust the range scale so as to place that distance off scale. The response of the system to this occurrence is described below.

Figure 1B:
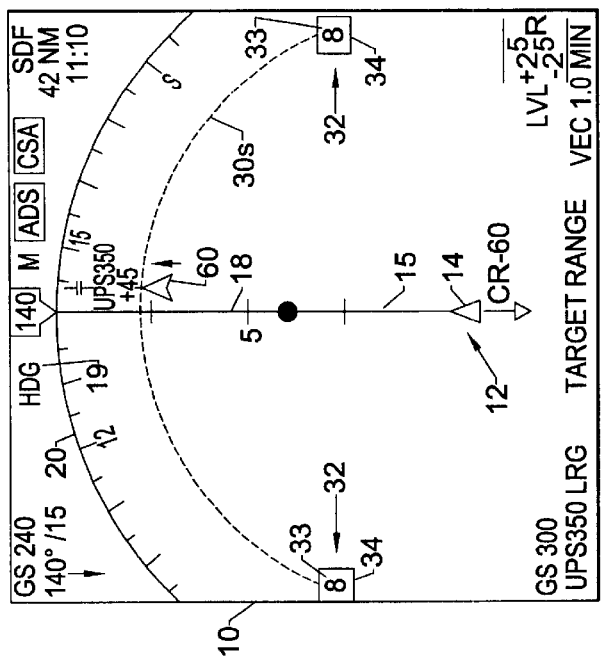
FIG. 1B shows the cockpit display of FIG. 1A, with the range scale changed to a new setting.

A target 60, representing another aircraft, is displayed at its position of just under 8 nautical miles from the own aircraft in the example shown in FIG. 1A. The information needed to display the target 60 may be obtained from any available source, such as an ADS-B broadcast from the target, or a TIS signal. If the pilot wishes to view the target location with greater resolution, the pilot may press the key 43 ("R↓") and change the range scale from 20 nautical miles to, for example, 10 nautical miles as shown in FIG. 1B. When this occurs, the range ring mode remains in the selectable mode. The position of the range ring 30s is shifted so that it still is 8 nautical miles from the own aircraft symbol 14. As shown in FIG. 1B, 8 nautical miles is now much closer to the compass arc 20. The position of the target display 60 makes a corresponding change, and thus keeps the same relative position to the range ring 30s. It is easy for the pilot to track the relative position of the target, because both the range ring and the target represent the same distances from the own aircraft as they did prior to the range scale change.

In contrast, the CDTI is shown in the half-scale range ring mode before and after the same range scale change in FIGS. 2A and 2B. If the pilot elects not to enter a selected distance when the text boxes 34 are flashing, then the range ring function remains in the half-scale range ring mode. To distinguish the two range ring modes, the indicia ("10" in FIG. 2A) indicating the distance of the range ring from the own aircraft symbol 14 in the half-scale range ring mode is not enclosed within an outlined box. Any suitable visual difference may be used to distinguish the mode of the range indicator. Furthermore, the system may be programmed to cause the range ring to float at any prescribed position on the screen as the range scale changes. Thus, the half-scale range ring mode may be referred to more broadly as a "set-scale" range ring mode.

In FIG. 2A, before the range scale change the range ring 30h is halfway between the own aircraft symbol 14 and the compass arc 20. The target 60 at just under 8 nautical miles is spaced inside the range ring. After the same range scale change, the range ring now represents 5 nautical miles, and the target 60 is displayed well outside the range ring. In this case the pilot must refer to the range ring scale and mentally adjust to the fact that the target is no farther away even though it has moved outside the range ring.

Depressing the key 45 again toggles the range ring function off, removing the range ring from the screen regardless of its mode.

If a range scale adjustment moves the selected distance of the selectable range ring 30s outside the compass arc 20, the display of the range ring itself is removed, but the boxed distance markers 32 are positioned adjacent to the compass arc, as shown in FIG. 5. This may occur, for example, when the range scale is reduced. In the example shown in FIG. 5, assume that the compass arc earlier represented a distance of 30 nautical miles, and the range ring distance was been selected to be 25 nautical miles. Then, assume that the range scale was reduced to 20 nautical miles at the compass arc. A range ring of 25 nautical miles cannot still be shown, but the range ring setting is displayed in the boxes 34, which are positioned preferably just outside the compass arc 20. If the range scale is again increased while the range ring function is still on, to a value greater than the selected range ring distance, the display of the range ring 30s will again be shown.

Figure 6:
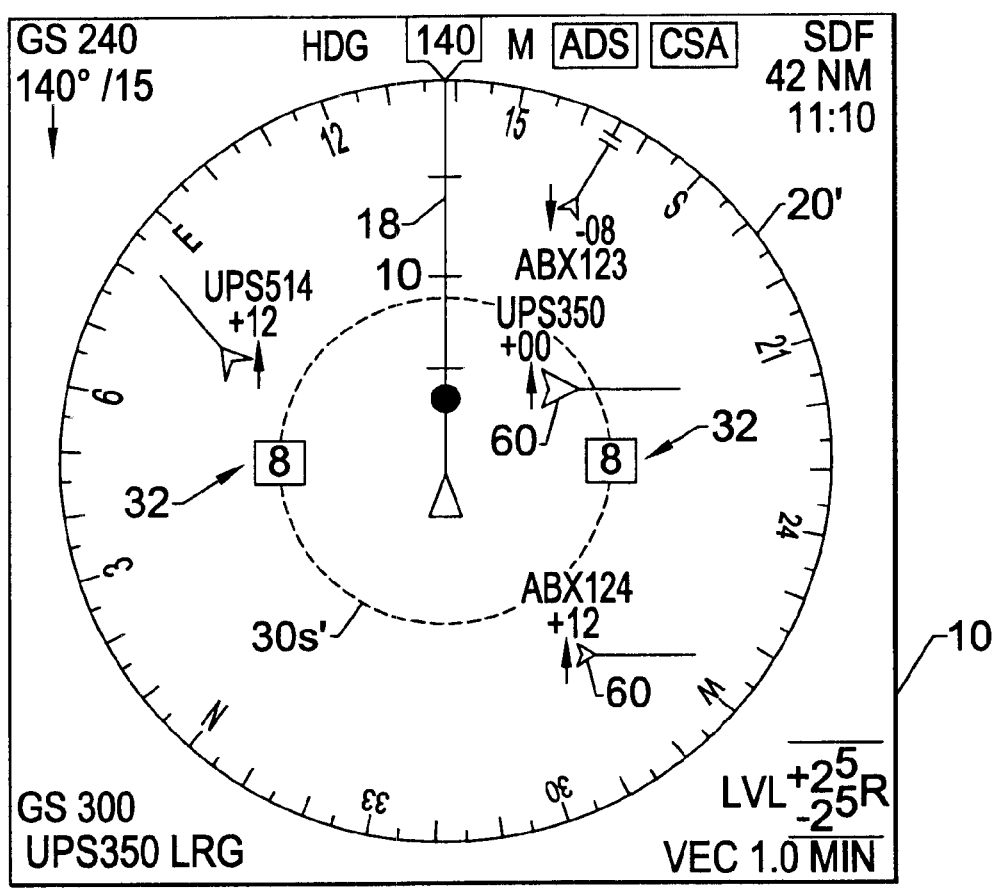
FIG. 6 shows a cockpit display of target information showing a full 360 degrees around the aircraft, and having a circular range ring in a fixed distance mode in the manner of FIG. 1B.

One skilled in the art will understand that another conventional map-viewing mode is a 360 degree compass rose 20' as shown in FIG. 6, with the own aircraft symbol 14 at the center of the display. In this map-viewing mode when in the selectable range ring mode, the range ring 30s is a full circle around the own aircraft symbol, but functions in the same manner as described above for the range ring 30s in connection with the compass arc 20. The range ring distance markers 32 may be positioned, for example, in the range ring at opposite sides of the own aircraft symbol 14. When in the half-scale range ring mode, the range ring circle (not shown) stays half-way between the own aircraft symbol and the compass rose 20'. As was the case for the arcuate range ring 30s, the distance markers 32 can be any of a variety of indicia or symbols in any of a variety of positions on the display 10.

In a preferred embodiment, the system of the invention can be used for range monitoring in the following manner. The position of targets 60 can repeatedly be compared to the position of the range ring 30s in a well known manner. When a selected target moves inside the range ring area for more than a set time, such as 3 seconds, an alert can be indicated to the pilot. Preferably, both audible and visual alerts are presented. For example, a speaker may announce "TARGET RANGE" and a text message "TARGET RANGE" or "TGT RANGE" may be displayed on the screen of the display 10. Alternative visual cues other than text can be used to indicate the target is still within range. The text message or other visual cue is retained until the selected target passes outside the range ring for a set time, such as 2 seconds. Upon initiation of a selectable range ring mode, a selected target already within the new range ring may optionally be treated differently, such as by omitting the audible alert. Range monitoring may optionally be disabled when the quality of surveillance information available on a particular target is degraded.

One skilled in the art can also apply the method and system of the present invention to indicate distance from an object other than an aircraft on a display of conditions within the range scale distance of the object. Similarly, the term "pilot" is used herein illustratively, and there may be users who are not pilots. Furthermore, when used in connection with an own aircraft display, a range ring can be overlaid on a weather, terrain, statutory map, traffic or other display of a condition near the aircraft. Preferably, the pilot can toggle between types of display while retaining the same range scale and range ring.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. In a method of displaying information on an electronic display relative to an object of known location, providing a range indicator on the display representing a selected physical distance from the object; and moving the range indicator in a fixed distance mode to maintain the selected distance represented by the indicator while changing the scale of physical distance represented on the display.

2. The method of claim 1, further comprising providing a set-scale distance mode by holding the range indicator at an initial position on the display while changing the scale of physical distance represented on the display, and altering the physical distance from the object represented by the indicator.

3. The method of claim 2, further comprising allowing a user to choose either the fixed distance or the set-scale distance mode, and prompting the user choosing the fixed distance mode to enter a selected physical distance.

4. The method of claim 3, wherein the electronic display is a cockpit display of traffic information, the object is an aircraft containing the display, and the range indicator is a range ring.

5. The method of claim 1, further comprising prompting a user to enter a selected physical distance.

6. The method of claim 5, wherein prompting the user comprises providing displaying a data entry area adjacent to the range indicator.

7. The method of claim 1, further comprising providing an alert when a target is at or within the distance from the object represented by the range indicator.

8. An electronic cockpit display of traffic information in a pilot's own aircraft, comprising:

a traffic display out to a distance from the own aircraft at a periphery of the display set by an adjustable scale;

a range indicator display representing a selected physical distance from the own aircraft, the range indicator moving in a fixed distance mode to maintain the selected distance from the own aircraft represented by the indicator as the adjustable scale changes.

9. The display of claim 8, wherein the range indicator display is selectively operable in a set-scale distance mode, in which the range indicator remains at an initial position on the display as the adjustable scale changes, and in which the physical distance from the own aircraft represented by the indicator varies with the scale adjustment.

10. An electronic display of information relative to an object, comprising:

a display of a condition out to a distance from the object at a periphery of the display set by an adjustable scale;

a range indicator display representing a selected physical distance from the object, the range indicator moving in a fixed distance mode to maintain the selected distance from the object represented by the indicator as the adjustable scale changes.

11. In a method of displaying traffic information on an electronic display relative to an own aircraft, providing a range indicator on the display representing a selected physical distance from the own aircraft; and moving the range indicator in a fixed distance mode to maintain the selected distance represented by the indicator while changing the scale of physical distance represented on the display.

* * * * *